United States Patent
Pierce

[11] Patent Number: 5,392,940
[45] Date of Patent: Feb. 28, 1995

[54] PET WASTE DISPOSAL SYSTEM

[75] Inventor: Don C. Pierce, Port Clinton, Ohio

[73] Assignee: Hueter Toledo, Inc., Bellevue, Ohio

[21] Appl. No.: 110,393

[22] Filed: Aug. 23, 1993

[51] Int. Cl.6 ............................................. B65D 45/32
[52] U.S. Cl. .................... 220/4.33; 220/669; 220/484
[58] Field of Search ............ 220/4.33, 4.26, 4.31, 220/7, 484, 4.16, 669

[56] References Cited

U.S. PATENT DOCUMENTS

| | | | |
|---|---|---|---|
| D. 258,409 | 3/1981 | Nattrass | 220/4.33 |
| 1,627,282 | 5/1927 | Gran | 220/4.33 |
| 1,749,581 | 3/1930 | Hauser | 220/4.33 |
| 1,781,909 | 11/1930 | Willson | 220/4.33 |
| 1,915,045 | 6/1933 | Bales | 220/4.33 |
| 2,225,110 | 12/1940 | Hearn | 220/4.33 |
| 2,775,361 | 12/1956 | Kasdan | 220/4.33 |
| 3,266,656 | 8/1966 | Kridle | 220/4.33 |
| 3,374,915 | 3/1968 | Verhein et al. | 220/4.33 |
| 3,972,440 | 8/1976 | Warre | 220/653 |
| 4,050,604 | 9/1977 | Flanders | 220/4.33 |
| 4,699,291 | 10/1987 | Prais et al. | 220/4.33 |

*Primary Examiner*—Joseph Man-Fu Moy
*Attorney, Agent, or Firm*—Donald R. Fraser

[57] ABSTRACT

The pet waste disposal system is provided. The system includes an interior chamber formed by a plurality of generally vertically extending panels arranged to define an upper entrance to the interior chamber. Clip means are provided to suitably secured adjacent abutting edges of panels. A normally closed closure member is hingedly secured to the upper edge of one of the panels.

2 Claims, 2 Drawing Sheets

PET WASTE DISPOSAL SYSTEM

BACKGROUND OF THE INVENTION

The disposal of pet waste such as dogs for example has become an ever increasing problem. As population centers gain in density, property owners tend to be satisfied, for whatever reason, to live on smaller sized lots. Pet owners have consequently been faced with the continuing problem of disposal of their pet's waste. While the problem is particularly prevalent with dog waste, it will be understood that waste from other pets has a similar concern.

Attempts have been made to develop implements to assist pet owners in the disposal of waste. These attempts have met with appropriate reception but have required the disposal of the waste through municipal garbage haulers and the like.

SUMMARY OF THE INVENTION

It is an object of the present invention to produce a waste disposal system particularly adaptable to residential pet owners.

A principle object of the invention is to produce a pet waste disposal system which may be shipped and stored in a knock-down condition, and may be easily assembled and installed for use with the requirement of minimal mechanical skill and attendant tools.

Another object of the invention is to produce a waste disposal for pets which may be readily expanded from a one pet size to a larger size.

Still another object of the invention is to produce a waste disposal system for pets which is light in weight, rigid in construction, and may be formed of a thin wall plastic material, for example.

The above as well as other objects and attendant advantages of the invention can typically be achieved by a waste disposal system comprising a chamber having an open upper entrance, a major portion of the chamber disposed beneath the surface of the ground, the chamber being defined by a plurality of panels of means for coupling adjacent edges of the panels; and closure means disposed to selectively close the open upper entrance of the chamber.

BRIEF DESCRIPTION OF THE DRAWINGS

The above objects and advantages of the invention will become manifest to those skilled in the art by reading the following detailed description of a preferred embodiment of the invention when considered in the light of the accompanying drawings, in which.

Figure 1:
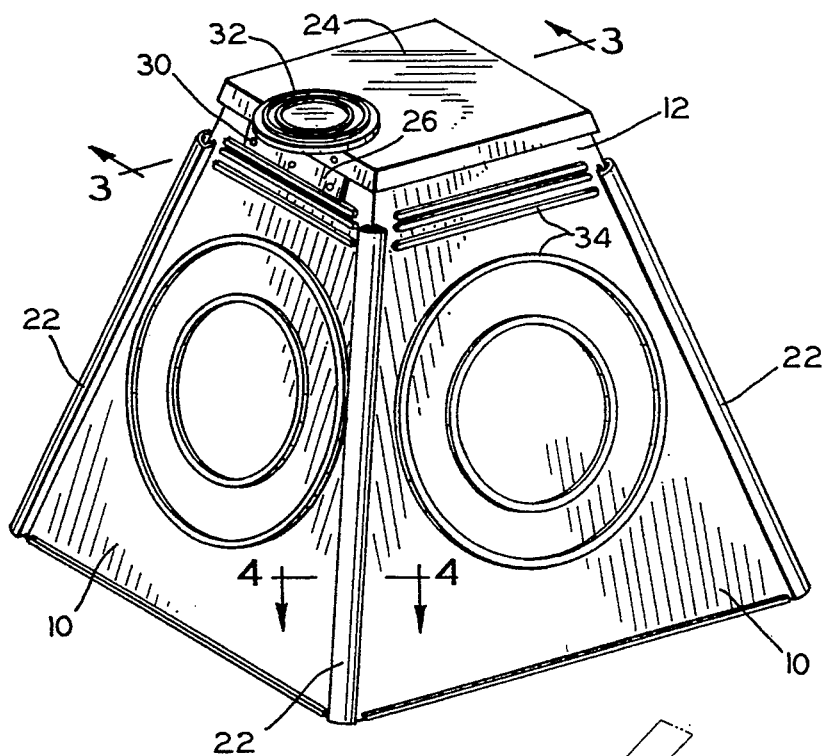
FIG. 1 is a perspective view of a pet waste disposal system incorporating the features of the present invention.
Figure 2:
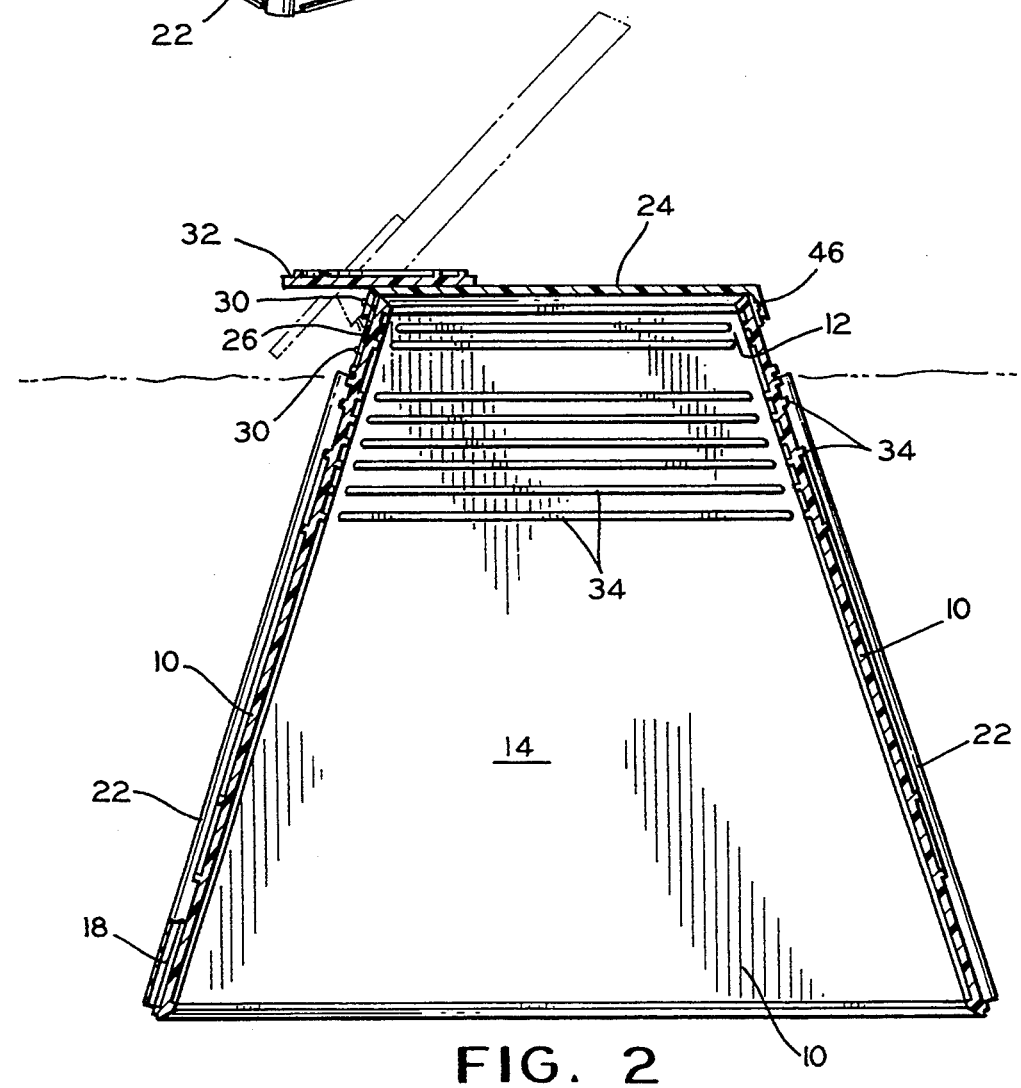
FIG. 2 is a vertical sectional cross view of the system illustrated in FIG. 1.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENTS

Referring initially to FIGS. 1 through 4 of the accompanying drawings, there is illustrated a pet waste disposal system embodying the features of the invention. A plurality of substantially identical panels 10 of generally trapezoid shape are assembled to form an open upper entrance or opening 12 and cooperate to define an interior chamber 14. The angularly inclined side edges 16 of the panels 10 are provided with outwardly extending rib members 18 and complimentary surfaces 20 adapted to abut against corresponding surfaces 20 of adjacent panels 10 in the erected condition as illustrated in the drawings.

The surfaces 20 are maintained in abutting relationship with abutting surfaces 20 of adjacent panels 10 by elongate clip members 22. The clip members 22 are typically formed of substantially inert plastic material having elasticity memory properties. The clip members 22 have sufficient inherent physical strength properties to clip the adjacent panels 10 together and maintain the panels 10 in the desired relative position during erection of the system and placement thereof in the ground for use.

A closure 24 is provided selectively close to the entrance 12. The closure 24 is hingedly secured to the upper marginal edge of one of the panels 10 by a "living" hinge 26. The hinge 26 is formed of plastic material capable of being flexed without fracturing. It will be noted that in the illustrated embodiment of the invention, the hinge 26 is provided with a zone 28 of reduced thickness which extends the length of the hinge 26. Flexure of the hinge 26 will typically occur along the zone 28. One marginal edge of hinge 26 is secured to the associated panel 10 by fasteners such as rivets 30 for example, while the opposed marginal edge of the hinge 26 is similarly secured to the closure 24.

A toe or foot engaging extension 32 is provided integral with and extending from the closure 24 to facilitate the opening of the closure 24. By imposing a downward pressure or force on the portion of the extension 32 remote from the closure 24, the closure 24 will be caused to move about the hinge 26 from a closed to an open position. The elastic memory of the hinge 26 will cause the closure 24 to automatically return to its normally closed position upon the removal of the pressure or force on the extension 32.

A plurality of spaced apart reinforcing ribs 34 may be formed to extend outwardly from the main extended inner and outer surfaces of the panels 10.

It will be appreciated that the assemblage of components utilized to fabricate the aforedescribed system may be shipped and/or stored in a "knock-down" unassembled condition.

In use, the assemblage is initially inserted in an appropriate hole in the ground. Soil is then filled around the outer surfaces of the panels 10 to the approximate level illustrated in FIG. 2. Sufficient space should be provided beneath the extension 32 to permit complete downward movement of the extension 32 to effect an opening of the closure 24 to provide access to the interior chamber 14. Pet waste may then be disposed within the chamber 14. The normal degradation of the waste may be accelerated by the occasional addition of lime or other digester chemicals to the contents within the chamber 14.

Figure 5:
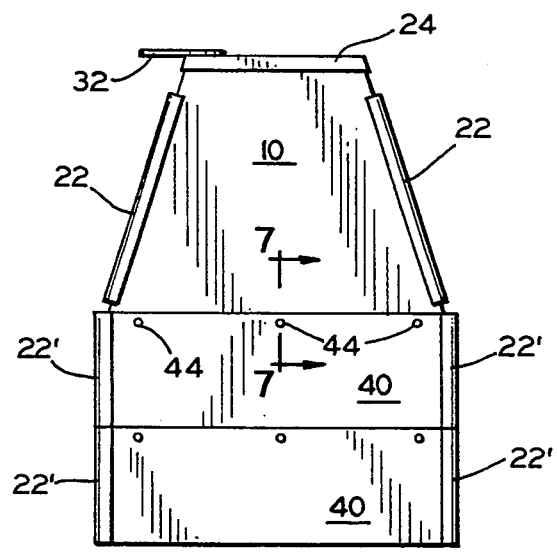
FIG. 5 is an elevational view of an embodiment of the invention illustrating an expansion chamber for the system illustrated in FIGS. 1 through 4 inclusive.
Figure 6:
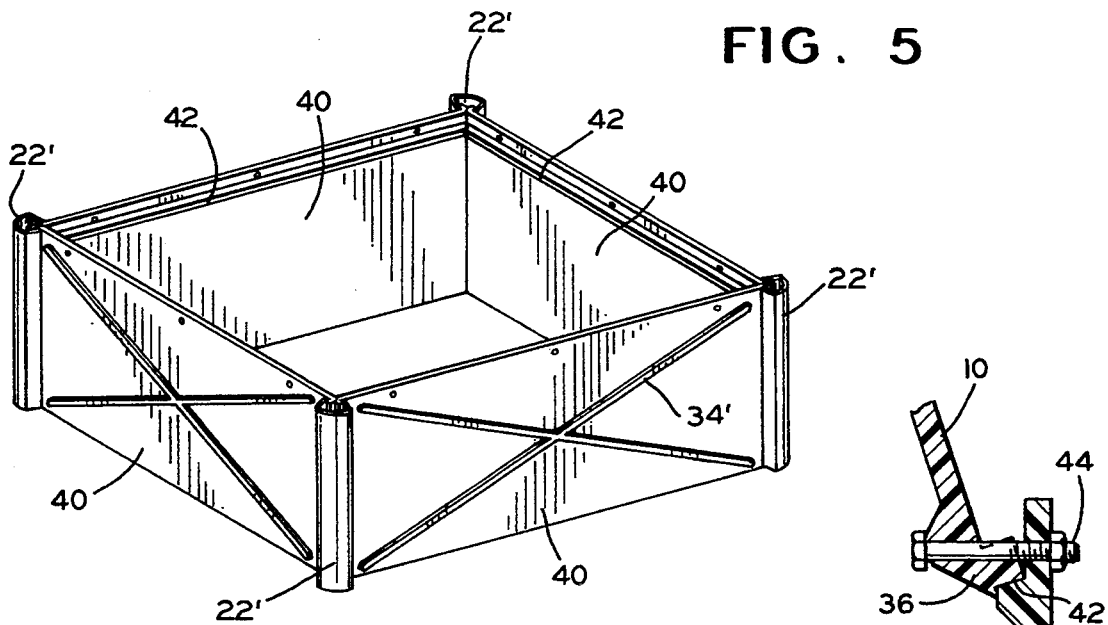
FIG. 6 is an enlarged perspective view of one of the expansion sections illustrated in FIG. 5.
Figure 7:
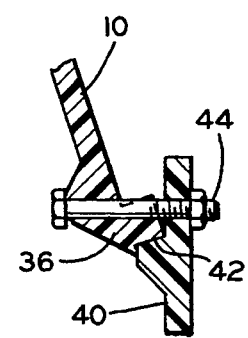
FIG. 7 is a fragmentary sectional view of structure suitable for interconnecting the bottom edge of the system illustrated in FIG. 1 with the upper edge portion of the expansion chamber.

In order to create additional volume and thence waste capacity to the chamber 14, rectangular panels 40 formed with the same edge configuration and material as the panels 10 are assembled as illustrated in FIGS. 5 to 7 inclusive. Prime reference numerals are employed in FIGS. 5 to 7 to illustrate components which are similar to components illustrated in FIGS. 1 to 4. Note the reinforcing ribs 34' formed on the outer surface of the panels 40.

The panels 40 are assembled into a rectangular configuration as clearly illustrated in FIG. 6 and suitably maintained in assembled condition by clip members 22'.

In use, the assemblage illustrated in FIG. 6 may be disposed below the assemblage illustrated in FIGS. 1 to 4 to effectively increase the overall volume of the interior chamber. The resulting structure may be secured together in the manner illustrated in FIG. 7, for example. More particularly, outwardly extending ribs 36 are formed to be generally concomitant with the lower margin edges of the outer surface of each of the panels 10. The ribs 36 are adapted to be disposed upon inwardly extending shoulders 42 formed to be generally concomitant with the upper margin edges of the inner surface of each of the panels 40.

Threaded fasteners 44 may be inserted through suitably aligned apertures formed in the panels 10 and 40. When the threaded fasteners 44 are tightened, a unitary structure is formed and may be inserted into the soil in a manner similar to that discussed herein before.

Figure 3:
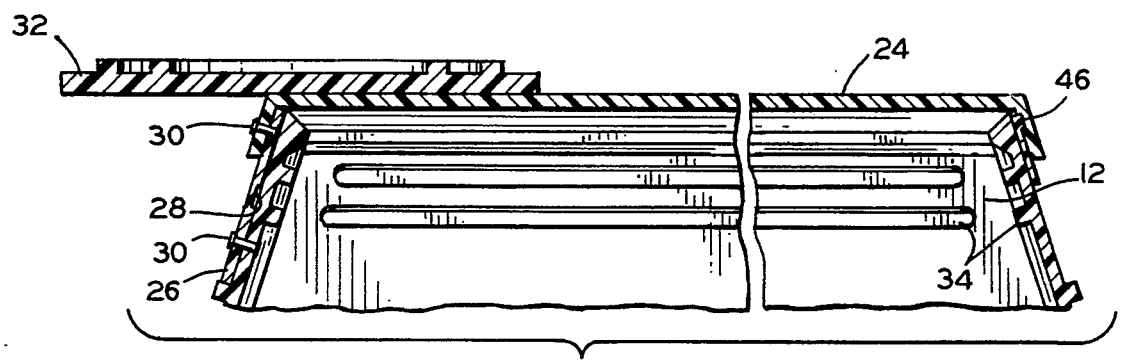
FIG. 3 is an enlarged fragmentary sectional view taken along line 3—3 of FIG. 1.
Figure 4:
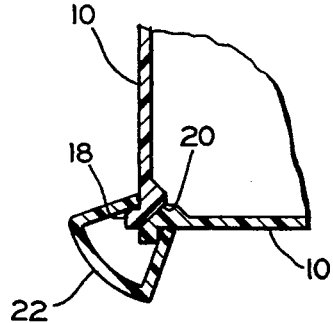
FIG. 4 is an enlarged fragmentary sectional view taken along line 4—4 of FIG. 1.

As illustrated in FIG. 3, the closure 24 may be provided with a latch mechanism 46 to maintain the closure in a fully closed position. The elasticity of the downwardly depending portion of the closure 24 enables closure and will snap open when downward pressure is applied to the extension 32.

I claim:

1. An animal waste disposal chamber for substantial disposition beneath the surface of the ground, said chamber maintainable in an unassembled, generally planar condition prior to assembly and installation in the ground, and comprising:
    a) a plurality of planar wall panels, each wall panel provided with angled side edges forming side surfaces for abutting complementary side surfaces on adjacent wall panels when said chamber is assembled, the side edges having a retention rib member with a side surface extending from the planar wall panel;
    b) a plurality of elongate connectors, each connector provided with a longitudinal channel for receiving and securing the retention rib member of the abutting side surfaces of adjacent wall panels such that said plurality of planar wall panels are secured by said plurality of connectors to define a waste disposal chamber having a top aperture and a bottom aperture of an area larger than the area of the top aperture; and
    c) a cover hingedly secured to said plurality of planar panels about the top aperture, said cover positioned in a normally closed position for enclosing the top aperture, and including a foot pedal integrally formed in said cover for selectively moving said cover to an open position, whereby the planar panels and connectors are formed into a chamber and buried under the ground such that the top aperture and cover extend above the ground to facilitate the disposal of animal waste through the top aperture and into the chamber for decomposition into the ground.

2. The animal waste disposal chamber defined in claim 1 wherein said plurality of planar panels includes four identical, trapezoidal shaped panels, each panel provided with a bottom edge and a parallel top edge, the bottom edge being greater in length than the top edge such that the bottom aperture is greater in area than the top aperture.

* * * * *